United States Patent
Stewart et al.

(10) Patent No.: US 8,272,049 B2
(45) Date of Patent: Sep. 18, 2012

(54) MULTI-DOMAIN COMPUTER PASSWORD MANAGEMENT

(75) Inventors: Christopher H. Stewart, Houston, TX (US); Jon P. Styskal, Houston, TX (US); Nazih H. Hage, Cypress, TX (US); Valiuddin Y. Ali, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 836 days.

(21) Appl. No.: 12/354,554

(22) Filed: Jan. 15, 2009

(65) Prior Publication Data

US 2010/0180338 A1    Jul. 15, 2010

(51) Int. Cl.
G06F 21/00 (2006.01)
(52) U.S. Cl. .......................................... 726/19; 713/183
(58) Field of Classification Search ............... 726/19; 713/183

See application file for complete search history.

(56) References Cited

U.S. PATENT DOCUMENTS

| | | | |
|---|---|---|---|
| 6,574,655 B1* | 6/2003 | Libert et al. | 709/200 |
| 7,251,732 B2 | 7/2007 | Jamieson et al. | |
| 7,389,535 B2 | 6/2008 | King et al. | |
| 7,619,544 B2* | 11/2009 | Piwonka et al. | 341/26 |
| 2002/0054120 A1* | 5/2002 | Kawano et al. | 345/773 |
| 2002/0078386 A1* | 6/2002 | Bones et al. | 713/202 |
| 2004/0260953 A1* | 12/2004 | Jamieson et al. | 713/202 |
| 2005/0027713 A1* | 2/2005 | Cameron et al. | 707/100 |
| 2007/0101117 A1* | 5/2007 | Piwonka et al. | 713/2 |
| 2008/0083019 A1* | 4/2008 | Wang et al. | 726/5 |
| 2008/0108881 A1* | 5/2008 | Stupp et al. | 600/300 |
| 2008/0177920 A1* | 7/2008 | Dennis | 710/200 |
| 2010/0057440 A1* | 3/2010 | Springfield et al. | 704/8 |
| 2011/0072511 A1* | 3/2011 | Gillespie | 726/19 |

* cited by examiner

*Primary Examiner* — Michael Pyzocha

(57) ABSTRACT

A computer system has first and second password-protectable domains. The first domain has a multi-domain password manager for determining whether a password candidate is valid for both the first domain and the second domain. If so, the password manager submits the password candidate to the second domain.

18 Claims, 6 Drawing Sheets

| KEYBOARD LAYOUTS | a b c . . . | A B C . . . | á ù . . . | 1 2 . . . | Π Ξ Φ . . . | ў џ я . . . | د ن ظ . . . |
|---|---|---|---|---|---|---|---|
| U.S. English | Y Y Y | Y Y Y | | Y Y | | | |
| U.K. English | Y Y Y | Y Y Y | | Y Y | | | |
| French | Y Y Y | Y Y Y | Y Y Y | Y Y | | | |
| Spanish | Y Y Y | Y Y Y | Y Y Y | Y Y | | | |
| Latin American Spanish | Y Y Y | Y Y Y | Y Y Y | Y Y | | | |
| Russian | | | | Y Y | | Y Y Y | |
| Kazakh | | | Y | Y Y | | Y Y Y | |
| Czech | Y Y Y | Y Y Y | | Y Y | | | |
| Greek | Y Y Y | Y Y Y | | Y Y | Y Y Y | | |
| Greek Latin | | | | Y Y | | | |
| Arabic | | | | Y Y | | | Y Y Y |
| Arabic AZERTY | | | | Y Y | | | Y Y Y |

FIG. 2

MULTI-DOMAIN COMPUTER PASSWORD MANAGEMENT

BACKGROUND

Passwords are widely used for authentication by computers and networks. A single user can require tens or even hundreds of passwords to access all the desired password-protected domains. As a result password management has become a burden for users, who can suffer inconvenience and worse when a password is lost.

Software password managers have been developed to ease this burden. For example, some browsers monitor passwords as they are entered by a user and offer to "remember" the password. When a user next visits a remembered domain, the browser can enter the password automatically. Comparable systems are used for boot, operating-system log-in, and other passwords required for secure computer operation.

BRIEF DESCRIPTION OF THE DRAWINGS

The figures depict implementations/embodiments of the invention and not the invention itself.

FIG. 2 is a table showing an assignment of text-entry characters to keyboard layouts.

DETAILED DESCRIPTION

In the course of the present invention, it was recognized that, while existing password managers addressed the problem of remembering and using passwords, they do not address the burden of creating the passwords in the first place. Users still have to create large numbers of passwords that conform to rules (e.g., acceptable characters and character combinations) that vary from domain to domain. An embodiment provides a password manager that validates submitted passwords according to the rules for the domain in which the password manager resides, but also according to the validation rules for other domains. Once the password manager has validated a password, it can be accepted by the owning domain and submitted to the other domains for adoption. The domains can interact so that the user only needs to enter the password once to be authenticated to the different domains, thus simplifying the generation and use of new passwords.

Figure 1:
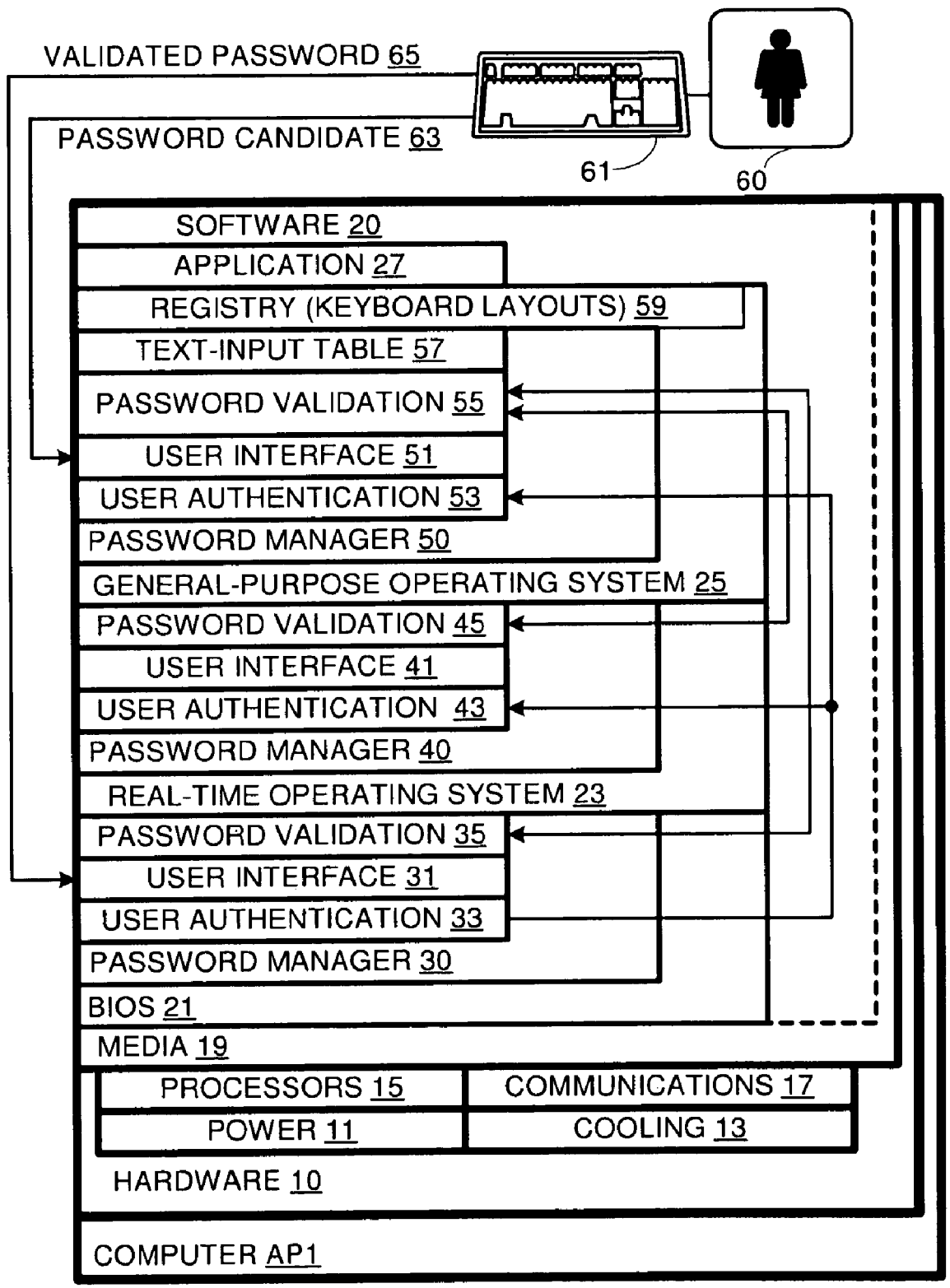
FIG. 1 is a schematic diagram of a computer system in accordance with an embodiment of the invention.

A computer system API in accordance with an embodiment of the invention includes hardware 10, as shown in FIG. 1. Hardware 10 includes a power supply 11, cooling device 13, processors 15, communications devices 17, and computer-readable storage media 19, such as main memory and hard disks.

Software 20, including computer-executable program instructions and computer-readable data, is physically encoded on media 19. Software 20 includes a basic input-output system (BIOS) 21, a real-time operating system (RTOS) 23, a general-purpose operating system (GPOS) 25, and an application 27. Windows, MacOS, and HPUX are examples of general-purpose operating systems in that they are used for running a variety of application programs.

BIOS 21, typically encoded in read-only memory or flash memory, includes a password manager 30. Password manager 30 provides a user interface 31 for receiving text-input passwords, a user authentication function 33, and a password validation function 35. A BIOS password can be used to prevent unauthorized access to computer API.

RTOS 23 includes a password manager 40. Password manager 40 provides a user interface 41 for receiving text input passwords, a user authentication function 43, and a password validation function 45. An RTOS password can be used to prevent unauthorized access to an encryption key used to decrypt information stored on a hard disk.

GPOS 25 includes a password manager 50. Password manager 50 provides a user interface 51 for receiving text-input passwords, a user authentication function 53, and a password validation function 55. In addition, password manager 50 provides a text-input table 57 and a registry 59 identifying registered keyboard layouts. The keyboard layouts generally correspond to different languages, e.g., English, Spanish, Korean, Chinese, Cyrillic, Arabic, etc. A GPOS password can be used to prevent unauthorized logins to GPOS accounts.

Figure 3:
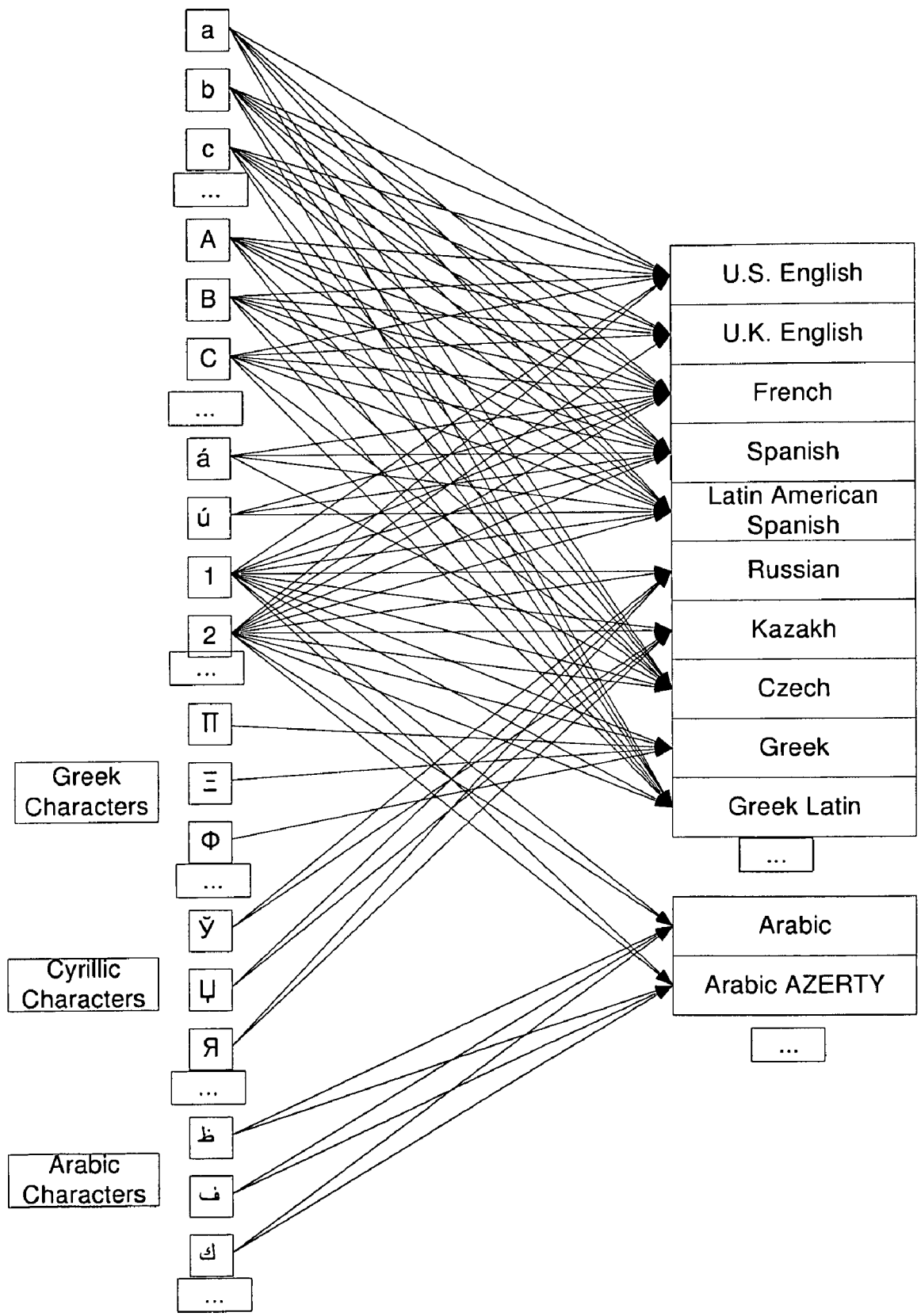
FIG. 3 is a mapping of characters to keyboard layouts corresponding to the table of FIG. 2.

Text input table 57 is represented in somewhat greater detail in FIG. 2. The rows correspond to keyboard layouts, while the columns correspond to characters. Table 57 can be quite large as there are tens of thousands of text characters and hundreds of keyboard layouts. Even languages that share the same basic alphabet differ in their handling of diacritical marks and accents. Each row*column intersection cell includes a "Y" indication of whether the character in the cell's column is producible using the keyboard layout of the cell's row. This table can be used as described below in the context of the method embodiments in which a user 60 uses a keyboard 61 or other input means (copy-and-paste or "Input Method Editors" (IMEs)) to submit a password candidate 63 for validation and then to submit a resulting validated password 65 for authentication. FIG. 3 is a mapping of characters to keyboard layouts corresponding to text input table 57.

Figure 4:
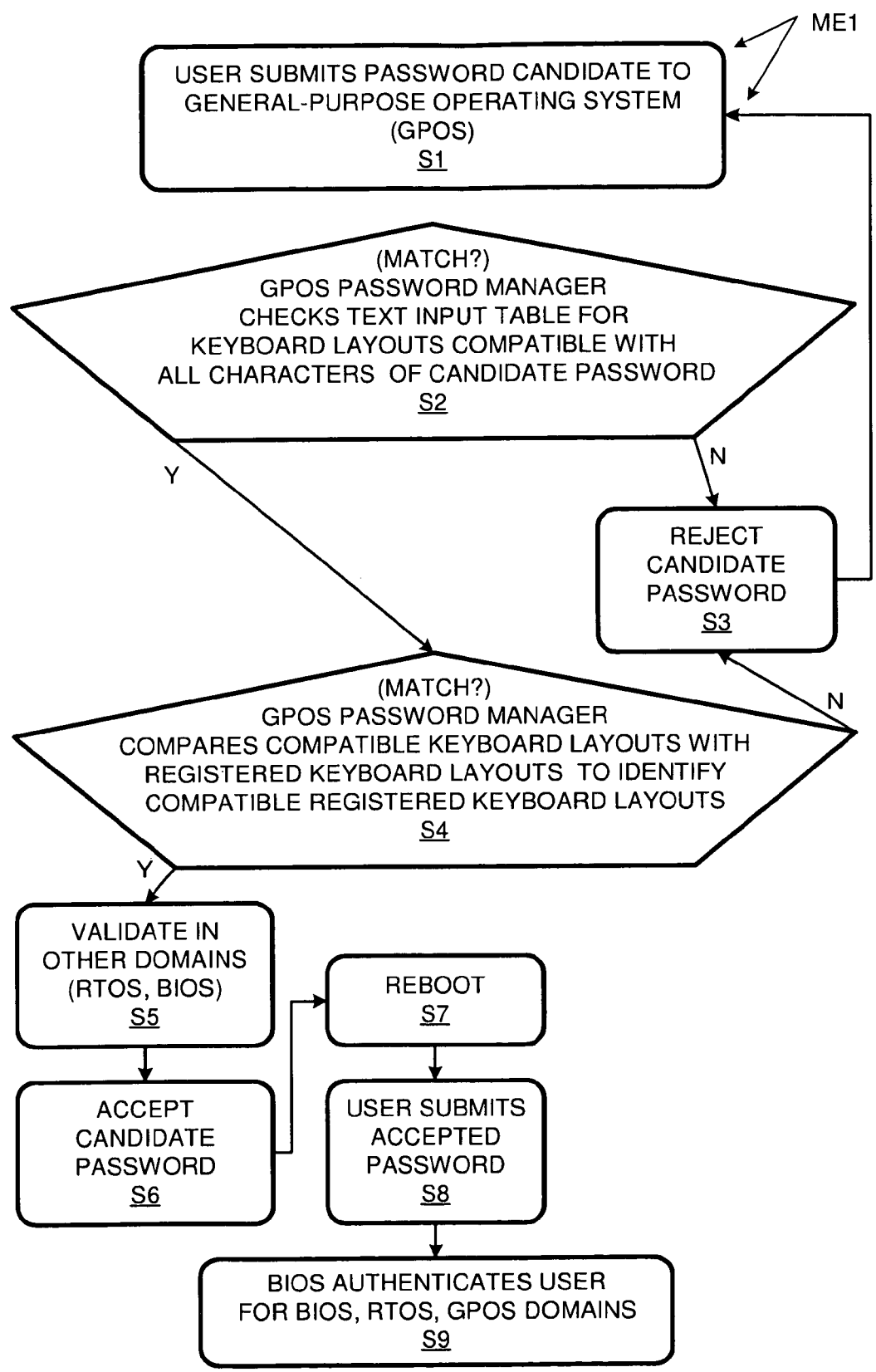
FIG. 4 is a flow chart of a method in accordance with an embodiment of the invention.

A method ME1 in accordance with an embodiment of the invention is flow charted in FIG. 4. At step S1, a user 60 (FIG. 1) submits password candidate 63 to user interface 51 of password manager 50 of GPOS 25. This submission can be made by user 60 typing on keyboard 61. However, in some cases an IME interface can be used for text entry, allowing a full range of characters to be selected. Another alternative is to cut-and-paste a password, e.g., from the Internet, although some password interfaces preclude pasting of passwords.

Figure 5:
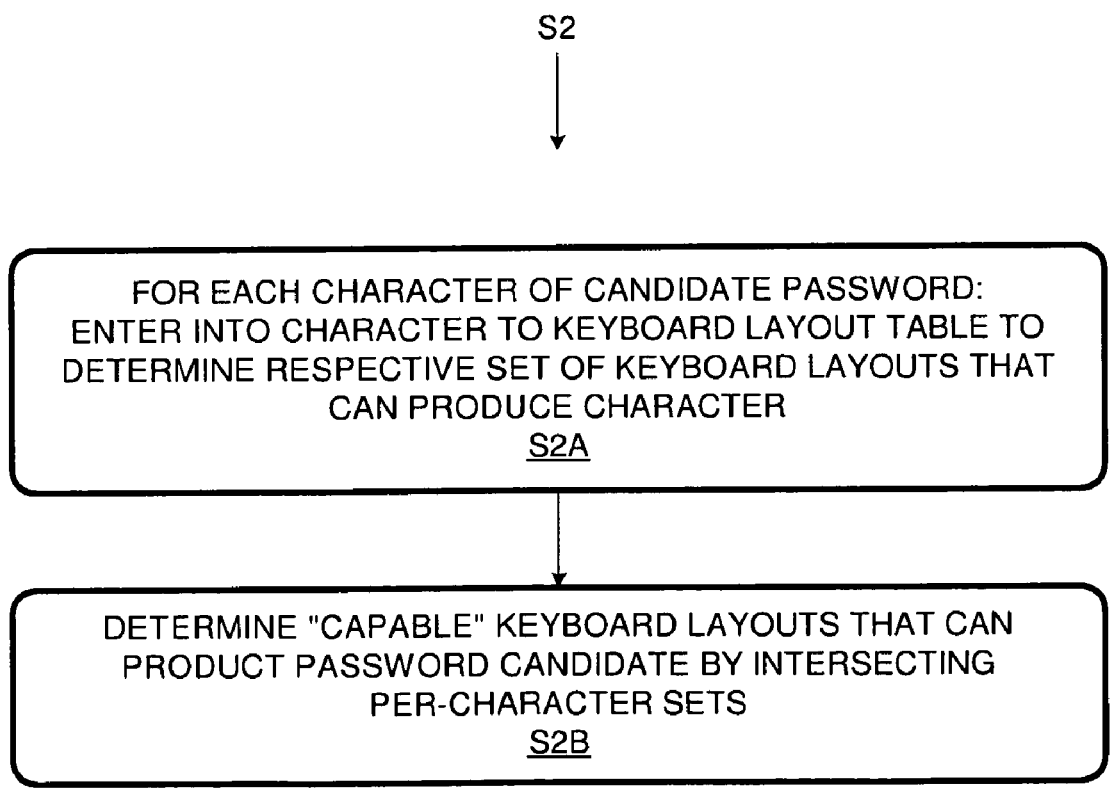
FIG. 5 is a flow chart of a step S2 of the method of FIG. 4.

At step S2, GPOS password validation function 55 checks text-entry table 57 for keyboard layouts that are compatible with password candidate 63. Step S2 can be broken into two substeps S2A and S2B, as shown in FIG. 5. At substep S2A, each character is input to table 57 to determine a set of compatible keyboard layouts that are capable of producing the respective character. At substep S2B, the intersection of the sets of compatible keyboard layouts for all the characters of the password candidate is obtained, yielding a set of "capable" keyboard layouts.

If the set of capable keyboard layouts is empty, candidate password 63 is determined to be invalid and is rejected at step S3. From step S3, method ME1 returns to step S1 and waits for a new password candidate. In some embodiments, an explanation for the rejection is given to user 60 to provide guidance in the selection of the next candidate. At step S4, GPOS validation function 55 compares capable keyboard layouts to keyboard layouts registered in registry 59 to identify compatible registered keyboard layouts for computer API. If there are no compatible registered keyboard layouts, password candidate 63 is rejected at step S3 and method ME1 returns to step S1 to accept a new password for evaluation.

If, at step S4, password validation function 55 determines that there is at least one compatible registered keyboard layout, it submits password candidate 63 for validation to one or more other domains, in this case, BIOS 21 and RTOS 23. Alternatively, a validation by BIOS 21 can be "trusted" by RTOS 23, saving a validation step. Presumably, since password manager 50 has validated it against rules for all three domains, password candidate 63 will pass these validation procedures and be adopted as a validated password 65 at step S5.

In an alternative embodiment, a validation function merges step S4 with step S2 by considering only registered keyboard layouts when checking compatible keyboard layouts. Given an available keyboard layout, a determination would be made whether or not that keyboard layout could type the password candidate.

Another alternative would be to use the following prior-art approach. Given a collection of characters typable by all supported keyboard layouts taken as a whole, the password checker would accept the password as long as all of its characters are contained in this large set. However, it is not always possible to know the available keyboard layouts ahead of time.

The approach of FIG. 5 is to take the characters provided, check them against the intersection of supported keyboard layouts for all domains and then check this subset against the registered keyboard layout for the user whose password was checked. In order to be fast, mapping from characters to keyboard layouts (instead of the other way around) minimizes the latencies involved in candidate evaluation. The approach of FIG. 5 contributes to precision by winnowing the number of keyboard layouts down to a small number.

Sooner or later, user 60 reboots (restarts or powers down and powers on) computer API at step S7. As required, user 60 enters accepted password 65 in BIOS 21 at step S8, resulting in authentication. As the boot process continues, RTOS 23 checks that the BIOS password is the same as the accepted RTOS password and automatically authenticates user 60 without user 60 having to re-enter password 65 at step S9. Also at step S9, GPOS 25 checks that the BIOS password (or, alternatively, the RTOS password) is the same as the accepted GPOS password and automatically authenticates user 60 without user 60 having to re-enter password 65.

Computer API can be subjected to power management activities that do not actually reboot the machine. It is possible to hibernate the machine by writing the current GPOS memory state to a file and then powering down completely. When in this state, powering up will load the stored GPOS state into GPOS memory upon restart. Alternatively, computer can be put into a low-power state called "sleep", which reduces the power consumption without actually powering down completely. When a restart comes out of either of a sleep state or a hibernate states, both the BIOS and the RTOS are capable of re-authenticating the user. In practice, computer API can be configured to avoid either RTOS or BIOS re-authentication when coming out of hibernation and/or sleep, but the computer can also be configured to re-authenticate when coming out of these states. When the computer is configured to re-authenticate coming out of these states, method ME1 integrates with these power states as well as with a full system reboot.

Method ME1 is described in more abstract terms with reference to FIG. 4. At step V01, a password candidate is submitted to a first password-protectable domain. At step V02, the first domain applies validation rules for itself and a second domain to the password candidate. If it determines that the password candidate is not a valid candidate for both (all) domains, it is rejected at step V03. Note that the first domain can reject a candidate even if that candidate is a valid password for the first domain. For example, the first domain will reject a password candidate with a Korean character if that character cannot be entered in the second domain, even though that character can be entered in the first domain.

If the password character is validated (for both or all domains) at step V02, the first domain submits the candidate to the second domain for validation and adoption at step V04. Presumably, if the correct rules were applied at step V02, the second domain adopts the candidate, which becomes the authentication password for the second domain at step V05. Once the password is adopted by the second domain, the first domain adopts the password as its authentication password at step V06. In the case that a faulty rule is applied at step V02, a validated candidate may be rejected by the second domain at step V05; in that case, the candidate is rejected at step V03.

Once the password candidate has been adopted as an authentication password by both domains, sooner or later a user will reboot the computer, as indicated at step V07. In the course of the boot, the user submits the authentication password to the second domain at step V08. The second domain authenticates the user at step V09. Subsequently, at step V10, the first domain authenticates the user based on the authentication by the second domain at step V10. The authentication by the first domain does not require that the user submit the authentication password to the first domain.

Figure 6:
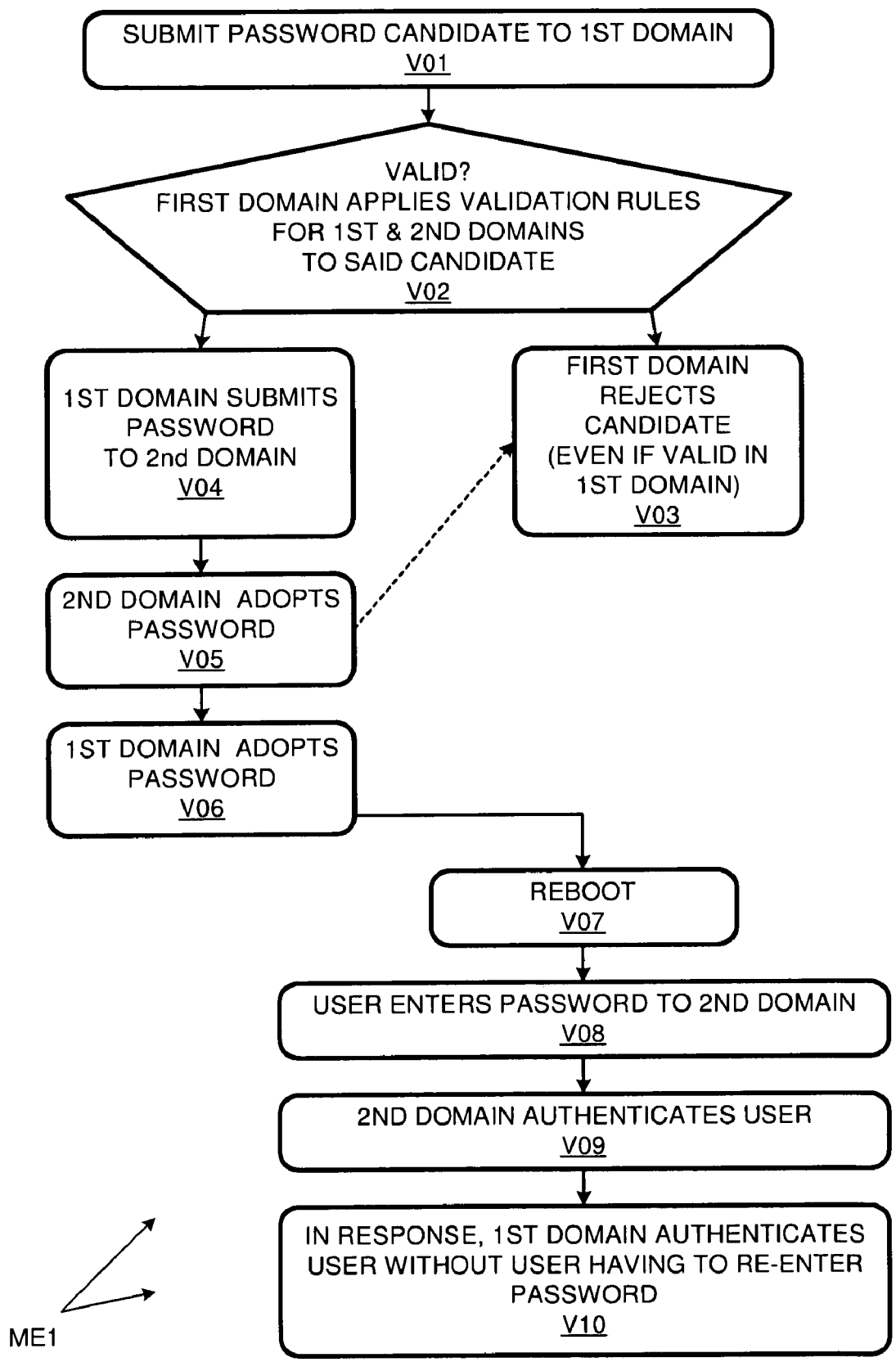
FIG. 6 is an alternative depiction of the method of FIG. 4.

The descriptions of FIG. 4 and FIG. 6 are related in that the first domain can be GPOS 25 and the second domain can be BIOS 21. Additional domains such as RTOS 23 are provided for. These domains are not used for primary validation (as is GPOS 25) nor for submission of the authentication password (as is BIOS 21). Validation for a third domain such as RTOS 23 is handled primarily by the first domain (GPOS 25) and user authentication is handled primarily by second domain BIOS 21.

Note that the validation (first) domain is different from the authentication (second) domain. Since method ME1 applies BIOS (second) validation rules passwords validated by the GPOS, the user will not be locked out of the BIOS due to selection of a password that cannot be entered at the BIOS level. Similarly, since method ME1 applies RTOS validation rules to passwords validated by the GPOS, the user will not inadvertently be locked out of the RTOS domain.

GPOS 25 supports very complicated password data entry mechanisms, including complex IMEs that can enter characters from scripts as diverse as those used for Chinese, Korean, Vietnamese, Japanese, Russian, and other languages using a graphical user interface. However, both BIOS 21 and RTOS 23 support only those characters that can easily be typed using a keyboard. Moreover, even though BIOS and RTOS data entry mechanisms can support more than one keyboard layout, it is not common for these data entry mechanisms to support changing the keyboard layout in the middle of typing a user's authentication token.

A keyboard layout is the mapping from the keys on a keyboard to the characters that typing produces through data entry. A U.S. English keyboard layout commonly supports only English letters, both upper- and lower-case, Arabic numerals, spaces, and punctuation characters commonly used in English. A Spanish keyboard layout, on the other hand, commonly supports all these characters, plus a means of entering accented characters such as é or ñ. A Russian keyboard layout will support the entry of Cyrillic characters, and so forth. Thus, RTOS 23 and BIOS 21 support only data entry from a single keyboard layout at a time, while GPOS 25 supports data entry using complex IMEs in which, moreover, characters from different IMEs can all be entered into the same password. Password manager 50 synchronizes passwords across GPOS 25, RTOS 23, and BIOS 21 in such a way that the limitations of each operating environment are respected Password manager 50 addresses the sheer complexity of identifying all the characters that a given individual keyboard layout can produce. In GPOS 25, there is not a one-to-one relationship between keystrokes and the characters produced by these keystrokes for all keyboard layouts. Differing character sequences can sometimes produce the same character output. Moreover, dozens of possible shift states are possible across the hundreds of keyboard layouts commonly supported by GPOS 25. A shift state is the keyboard state entered by depressing one or more shift keys either prior to or simultaneous to pressing keystroke sequences that produce one or more characters of data entry. Shift keys include the shift, control, and alt keys on the U.S. keyboard, plus additional shift keys for other keyboard layouts. These complex combinations reflect the fact that shift keys can be depressed in any combination along with one or more keystrokes of input to produce data entry characters. Some of these combinations result in data entry characters; others do not.

As demonstrated by a comparison of FIGS. 2 and 3, text-input table 57 serves as a map from characters of data entry to all the keyboard layouts that can produce those characters. Table 57 is generated prior to runtime. At runtime, password manager 50 simply maps backwards from individual characters to keyboard layouts that can produce that character. Password manager 50 checks this map for all characters in a password candidate, and if all can possibly be produced on a single keyboard layout that is also supported by the RTOS and BIOS domains (e.g., operating environments), then password manager 50 approves the password candidate and passes it on to BIOS 21 and RTOS 23 for final approval. If the password is approved at all steps it is approved and then synchronized from GPOS 25 to BIOS 21 and RTOS 23. Password manager 50 thus synchronizes the password in such a way that it is known that the user can enter that password at the BIOS and RTOS login prompts.

The foregoing inverse lookup method, instead of going through keyboard layouts one at a time to see if they can produce the password, has available to it the full set of characters producible by the most capable authentication domain (i.e. the GPOS). The inverse lookup method then goes through each character of the proposed password, mapping backwards from each successive proposed character to the keyboard layouts capable of producing this character. As the software advances through the characters in the proposed password, it continually maintains the intersection of the keyboard layouts capable of producing all characters up to that point with the keyboard layouts capable of producing the next character.

Thus, if {Spanish, French, German, English} is the current set of keyboard layouts capable of producing the first five characters of a 10-character password, and the sixth character can be produced by {Spanish, English, Norwegian, Chinese}, then the new intersection of keyboard layouts is {Spanish, English}, and so on through the rest of the characters in the password. This has a distinct performance advantage over using the keyboard layouts as the primary lookup mechanism because in the latter case it would be necessary to go through all keyboard layouts to see if they can produce the entire password. Inputting password candidate characters provides instantaneous access to the collection of keyboard layouts capable of producing each character; continually intersecting the current result with the collection for the next character only requires going through each password once.

Password manager 50 leverages the capabilities of the most capable domain (in this case GPOS 25) to do the fundamental processing of approving the password candidate for its self and for less capable domains. Moreover, one of the applications of synchronizing passwords is to allow one authentication environment to trust another's authentication of a user, bypassing further authentication of that user. This allows for different combinations of operating domains (e.g. BIOS alone with GPOS, RTOS alone with GPOS, or BIOS, RTOS, and GPOS all in combination) because all domains will have the same value for synchronized user tokens.

Since password approval is rules based and since each domain can provide for final password approval (but is not required to do so), new operating domains (e.g., "small" operating systems such as a stripped-down Linux implementation to add a certain feature in an otherwise GPOS environment) can be easily added in the future simply by incorporating the password approval rules of the new environment. Moreover, existing password-protected domains whose password approval rules improve can have these approvals reflected simply by changing the rules of approval for that domain.

Herein, related art is described to facilitate understanding of the invention. Related art labeled "prior art" is admitted prior art; related art not labeled "prior art" is not admitted prior art. Embodiments of the invention apply not only to operating system domains but also network and Internet domains. These and other variations upon and modifications to the illustrated embodiment are provided by the present invention, the scope of which is defined by the following claims.

What is claimed is:

1. A computer system comprising:
    hardware including a processor and computer-readable storage media encoded with code configured to, when executed by said processor,
    determine, using a password manager of a first password-protectable first domain and based at least in part on keyboard layouts including keyboard layouts associated with a password-protectable second domain, whether or not a password candidate is valid for adoption as an authentication password for said first and second domains, and
    adopt said password candidate as an authentication password for said first domain only if said password candidate is determined by said password manager of said first domain to be valid as an authentication password for said second domain based on said keyboard layouts.

2. A computer system as recited in claim 1 wherein said code is further configured to input each character of said password candidate to a character-to-keyboard-layout table to determine a capable set of keyboard layouts capable of producing that character, said password manager intersecting the capable sets for all characters of said password candidate to determine a compatible set of keyboard layouts compatible with said password candidate.

3. A computer system as recited in claim 1 wherein said first domain is a general-purpose operating system and said second domain is a BIOS.

4. A computer system as recited in claim 3 wherein said domains also include a real-time operating system for managing non-volatile storage media, said code being further configured to determine, based on keyboard layouts associated with said real-time operating system, whether said password candidate is valid for said real-time operating system and, if so, submitting said password candidate to said real-time operating system for acceptance as an authentication password for said real-time operating system.

5. A computer system as recited in claim 3 wherein said password candidate is rejected if, for one of said domains, there is no available keyboard layout from which said password candidate can be entered.

6. A computer system as recited in claim 5 wherein availability of a keyboard layout from which said password candidate can be entered is determined at least in part using a map of text-input characters to keyboard layouts from which those characters can be entered.

7. A multi-domain password management method comprising:
    entering a password candidate for adoption as an authentication password to a password-protectable first domain;
    said first domain applying respective validation rules for said first domain and a password-protectable second domain to said password candidate to make a validity determination, based on keyboard layouts, whether or not said password candidate is valid in both said first domain and said second domain; and
    in the event said password candidate is determined to be valid, said second domain accepting said password candidate as an authentication password for user authentication to said second domain.

8. A multi-domain password management method as recited in claim 7 wherein said applying involves inputting each character of said password candidate to a character-to-keyboard-layout table to determine a capable set of keyboard layouts capable of producing that character, said password manager intersecting the capable sets for all characters of said password candidate to determine a compatible set of keyboard layouts compatible with said password candidate.

9. A multi-domain password management method as recited in claim 7 wherein, if said first domain determines said password candidate is valid in said first domain but not valid in said second domain, said first domain rejects said password candidate for user authentication to said first domain.

10. A multi-domain password management method as recited in claim 7 further comprising:
    rebooting a computer that owns said first and second domains;
    a user entering said password candidate to said second domain;
    said second domain authenticating said user;
    said first domain authenticating said user in response to said second domain authenticating said user without requiring said user to enter said password for authentication to said first domain.

11. A multi-domain password management method as recited in claim 10 wherein said first domain is a general-purpose operating system and said second domain is a BIOS.

12. A multi-domain password management method as recited in claim 7 wherein said validity determination involves determining whether all characters of said password candidate are provided on a keyboard layout supported by said BIOS.

13. A manufacture comprising:
    non-transitory computer-readable storage media encoded with code configured to, when executed by a processor,
    determine, using a password manager of a first password-protectable first domain and based at least in part on keyboard layouts including keyboard layouts associated with a password-protectable second domain, whether or not a password candidate is valid for adoption as an authentication password for said first and second domains, and
    adopt a password candidate as an authentication password to authentication users to a first password-protectable domain based in part keyboard layouts associated with said second domain.

14. A manufacture as recited in claim 13 wherein said code is further configured to input each character of said password candidate to a character-to-keyboard-layout table to determine a capable set of keyboard layouts capable of producing that character, said password manager intersecting the capable sets for all characters of said password candidate to determine a compatible set of keyboard layouts compatible with said password candidate.

15. A manufacture as recited in claim 13 wherein said first domain is a general-purpose operating system and said second domain is a BIOS.

16. A manufacture as recited in claim 15 wherein said code is further configured to determine whether said password candidate is valid for a real-time operating system and, if so, submitting said password candidate to said real-time operating system for acceptance as an authentication password for said real-time operating system.

17. A manufacture as recited in claim 13 wherein said password candidate is rejected if for one of said domains, there is no available keyboard layout from which said password candidate can be entered.

18. A manufacture as recited in claim 17 wherein availability of a keyboard layout from which said password candidate can be entered is determined at least in part using a map of text-input characters to keyboard layouts from which those characters can be entered.

* * * * *